United States Patent [19]

Fazzina et al.

[11] Patent Number: 5,106,449
[45] Date of Patent: Apr. 21, 1992

[54] APPARATUS FOR FORMING CONTAINER STRUCTURES

[76] Inventors: Robert B. Fazzina, 43 Red Oak Rd., Oreland, Pa. 19075; Gerardus C. Molenaar, 415 W. Bristol Rd., Ivyland, Pa. 18974; S. Harry Fazzina, 104 E. Mill Rd., Flourtown, Pa. 19031

[21] Appl. No.: 492,801

[22] Filed: Mar. 12, 1990

[51] Int. Cl.⁵ .................................... B32B 31/18
[52] U.S. Cl. .................................... 156/510; 156/73.1; 156/211; 156/212; 156/215; 156/217; 156/256; 156/512; 156/580.1; 47/72; 264/152
[58] Field of Search .............. 156/211, 212, 213, 215, 156/217, 218, 256, 469, 483, 484, 510, 512, 73.1, 580.1; 264/152, 153, 160, 297.4, 554; 47/72; 53/207, 208, 455, 456, 462, 463, 562, 563

[56] References Cited

U.S. PATENT DOCUMENTS

| | | | |
|---|---|---|---|
| D. 287,950 | 1/1987 | Weder et al. | D11/143 |
| D. 289,024 | 3/1987 | Vaughn | D11/164 |
| D. 289,982 | 5/1987 | Weder et al. | D11/164 |
| D. 292,182 | 10/1987 | Weder et al. | D11/164 |
| D. 292,183 | 10/1987 | Weder et al. | D11/164 |
| D. 292,184 | 10/1987 | Weder et al. | D11/164 |
| D. 292,185 | 10/1987 | Weder et al. | D11/164 |
| D. 292,186 | 10/1987 | Weder et al. | D11/164 |
| D. 292,187 | 10/1987 | Weder et al. | D11/164 |
| D. 292,188 | 10/1987 | Weder et al. | D11/164 |
| D. 292,189 | 10/1987 | Weder et al. | D11/164 |
| D. 292,190 | 10/1987 | Weder et al. | D11/164 |
| D. 292,191 | 10/1987 | Weder et al. | D11/164 |
| D. 292,561 | 11/1987 | Weder et al. | D11/164 |
| D. 292,562 | 11/1987 | Weder et al. | D11/164 |
| D. 292,563 | 11/1987 | Weder et al. | D11/164 |
| D. 293,222 | 12/1987 | Weder et al. | D11/164 |
| D. 293,223 | 12/1987 | Weder et al. | D11/164 |
| D. 293,224 | 12/1987 | Weder et al. | D11/164 |
| D. 293,304 | 12/1987 | Weder et al. | D11/164 |
| D. 293,305 | 12/1987 | Weder et al. | D11/164 |
| D. 293,306 | 12/1987 | Weder et al. | D11/164 |
| D. 293,307 | 12/1987 | Weder et al. | D11/164 |
| D. 293,308 | 12/1987 | Weder et al. | D11/164 |
| D. 296,391 | 6/1988 | Abbott | D5/32 |
| D. 296,535 | 7/1988 | Weder et al. | D11/149 |
| D. 297,422 | 8/1988 | Weder et al. | D11/164 |
| D. 298,017 | 10/1988 | Weder et al. | D11/164 |
| D. 299,290 | 1/1989 | Abbott | D5/46 |
| 3,475,526 | 10/1969 | Seto | 264/554 |
| 4,090,903 | 5/1978 | Matsui | 156/211 |
| 4,208,836 | 6/1980 | Kramer | 47/72 |
| 4,216,620 | 8/1980 | Weder et al. | 47/72 |
| 4,297,811 | 11/1981 | Weder | 47/72 |
| 4,300,312 | 11/1981 | Weder et al. | 47/72 |
| 4,491,217 | 1/1985 | Weder et al. | 206/45.33 |
| 4,508,223 | 4/1985 | Catrambone | 206/423 |
| 4,662,107 | 5/1987 | Van Den Kieboom | 47/84 |
| 4,733,521 | 3/1988 | Weder et al. | 53/580 |
| 4,771,573 | 9/1988 | Stengel | 47/72 |
| 4,773,182 | 9/1988 | Weder et al. | 47/72 |
| 4,795,597 | 1/1989 | Whiteley et al. | 264/153 |
| 4,795,601 | 1/1989 | Cheng | 264/138 |

FOREIGN PATENT DOCUMENTS

2603159  3/1988  France .................................. 47/72

Primary Examiner—Caleb Weston
Attorney, Agent, or Firm—John W. Logan, Jr.

[57] ABSTRACT

Apparatus and methods for fabricating a container structure such as a flower pot cover. The invention comprises a frame supporting a reciprocating mandrel and a feed bed, said feed bed having an aperture positioned such that said reciprocating mandrel reciprocates into and out of said aperture; a roller for feeding a substrate across said feed bed and aperture; a die fixed to said frame in proximity to said aperture, said die cutting a form from said substrate, said form having a central section and a plurality of surrounding sections created by a plurality of radial slits cut by said die, said radial slits extending outward from said central section, each of said surrounding sections folding to form a sidewall of said container structure when said reciprocating mandrel pushes said cut form through said aperture; and ultrasonic weld heads for sealing said sidewalls so as to form a container a flower pot cover.

7 Claims, 6 Drawing Sheets

APPARATUS FOR FORMING CONTAINER STRUCTURES

FIELD OF THE INVENTION

The present invention is directed to container structures such as flower pot covers, as well as novel apparatus and methods for fabricating containers and flower pot covers. In particular, the present invention is directed to a novel flower pot cover and apparatus for forming flower pot covers, and methods for making the same.

BACKGROUND OF THE INVENTION

The present invention is directed to devices for fabricating container structures, and most particularly, a novel flower pot cover. Synthetic flower pot covers have gained great popularity in the horticulture industry. These covers wrap around or cover plastic and ceramic flower pots. Flower pot covers provide ornamental beauty, serve to retain the moisture of the plants and flowers with which they are utilized, and prevent leakage from flower and plant pots.

Previous methods of fabricating flower pot covers have utilized single unslit sheet forms which are molded into rigid or self-supporting structures by means of heat or the creation of pleats or folds. U.S. Pat. No. 4,733,182 discloses a container forming system in which the container is formed by the creation of a plurality of overlapping folds in a single sheet of material. The mechanism disclosed in U.S. Pat. No. 4,733,182 is complex and requires expensive fabrication apparatus.

U.S. Pat. No. 4,795,601 discloses a container forming system in which the walls of a flower pot cover are stamped from a thin sheet of metallize polyvinylchloride utilizing a heated male and/or female member. This technique of container construction similarly has several disadvantages. First, it requires the use of male and/or female members heated to between 80 and 120 degrees centigrade. Further, this technique is comparatively slow and frequently results in the formation of brittle containers which tear during removal from the mold. Different substrate materials require different levels of heat during fabrication. Determining and controlling the correct levels of heat for a given substrate can be problematic. Unintended variances in the applied heat of the matable members can result in the destruction of the cover.

In addition, the formed container structures disclosed in both patents must be physically removed from a molding member, thus adding fabrication steps and increased production time.

The present invention is directed to a novel container structure which improves over prior art devices and which can more easily be fabricated in the single downward stroke of a pnuematically or hydraulically controlled forming piston or mandrel. The mandrel of the present invention utilizes air blowers which rapidly expel the formed container into a bin or recepticle. Further, rather than utilizing matable male and female heated molds or a system of folds or pleats to fabricate a container from an uncut or unslit form, the present invention utilizes a specially cut or slit form which can quickly be constructed and formed into a container such as a flower pot cover, and sealed by sealing mechanisms such as ultrasonic weld heads.

The container or flower pot cover of the present invention can be constructed from any paper-like material such as PVC, wax paper, polyester, polyethelene, cellulose actate butyrate, polystyrene, etc. The present invention can further be constructed from metallic substrate materials such as copper, gold, and silver foil. Polyester and other plastics are particularly desirable materials from which to fabricate the container or cover because they can be fused using microwave, ultrasonic bonding or plastic welding.

The present invention further incorporates a novel apparatus and method which ca be utilized to form the container of the present invention. A particular feature of the present invention is inclusion of a special die, pnueumatically controlled mandrel, and ultrasonic weld heads which facilitate the welding of the container of the present invention.

It is therefore a principal object of the present invention to provide a container which is constructed using a cutting die which creates a novel slit structure which can be rapidly formed and fabricated into a container such as a flower pot cover.

It is a further object of the present invention to provide a flower pot cover which is constructed utilizing a slit form which folds into a flower pot cover upon being stamped by a pneumatic or hydraulically controlled mandrel or piston.

It is a further object of the present invention to provide a mechanism for forming a container structure such as a flower pot cover which utilizes a mandrel, with air blower mechanism, which rapidly forms and then blows the formed container into a storage bin or recepticle.

It is still a further object of the present invention to provide a novel container and flower pot cover which can be rapidly fabricated by the single stroke of a forming mandrel or piston.

It is still yet a further object of the present invention to provide an apparatus for forming a container structure such as a flower pot cover which can be rapidly sealed by ultrasonic weld heads. These and other benefits of the present invention will become apparent from the summary and detailed description which follows.

SUMMARY OF THE INVENTION

In accordance with the present invention, apparatus for fabricating a container structure. The apparatus comprises a frame supporting a reciprocating mandrel piston and a feed bed, the feed bed having an aperture positioned such that said reciprocating mandrel reciprocates into and out of the aperture; means for feeding a container substrate across the feed bed and aperture; die means fixed to said frame in proximity to the aperture, the die cutting a form from the substrate, the cut form having a central section overlying the aperture and a plurality of surrounding sections created by a plurality of radial slits cut by the die, the radial slits extending outward from the central section, each of the surrounding sections folding to form a sidewall of said container structure when the reciprocating mandrel pushes the cut form through the aperture; and means for sealing the sidewalls so as to form a container.

In the method of the present invention a flower pot cover is fabricated comprising the following steps: cutting a substantially square form from a substrate; cutting a plurality of radially extending slits which emanate from a central solid section of the form such that the slits define a central solid section surrounded by a plurality of a surrounding sections; placing the cut substantially square form on a table having an aperture such that the central solid section is centered over said aperture; pushing the central solid section through the aperture such that the surrounding sections bend upward to form a plurality of container sidewalls; and sealing the sidewalls so as to form a flower pot cover.

DETAILED DESCRIPTION OF THE PREFERRED EMBODIMENT

Figure 1:
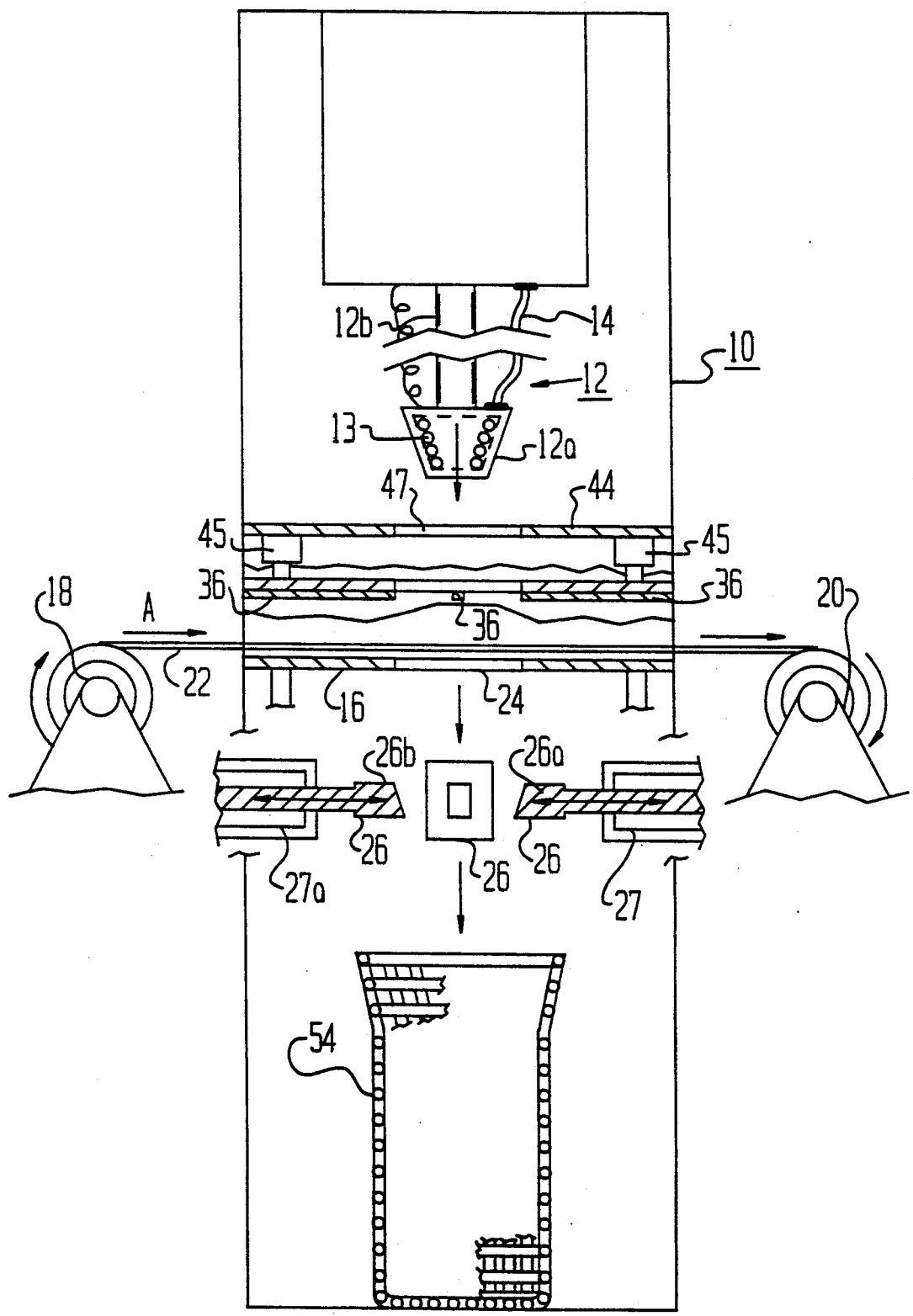
FIG. 1 is a side section view of the flower pot cover forming mechanism of the present invention.

The present invention is described with reference to the enclosed Figures wherein the same numbers are utilized were applicable. Referring to FIG. 1, the apparatus for making the container structure of the present invention is shown. As a prefatory note, while the present invention will be described principally herein with reference to the fabrication of a flower pot cover, it is to be appreciated that the apparatus, method, and container structure of the present invention can be utilized to construct any container such as a drinking cup, bowl, cup, box, food service tray and the like.

The container forming apparatus of the present invention comprises a frame 10 which supports an overhead reciprocating mandrel or piston 12. The mandrel comprises a trapezoidally shaped head 12a coupled to telescoping members 12b. The trapezoidally shaped mandrel head 12a is used to form the container. The upper portion of frame 10 includes a pneumatic (hydraulic) tank and cylinder (not shown) to control the mandrel 12. The reciprocating piston or mandrel head 12a includes apertures 13 connected to an expandable air line 14 which, as will be discussed in greater detail below, serve to eject the formed flower or plant pot cover into a recepticle or bin following fabrication. The reciprocating mandrel 12 is controlled by a hydraulic or pneumatic control system which may, for example, operate under the control of an 8-bit microprocessor or computer used in association with an optical encoder or comparable conventional position sensing component.

The frame 10 includes a flat support bed 16 which is straddled by feed 18 and take-up rollers 20 which are utilized to feed the paper-like rolled substrate form 22 in the direction "A" from which the flower pot cover is fabricated. It is to be appreciated that the feed rollers may be supported by an independent structure and wheeled into position beneath the mandrel.

Figure 2:
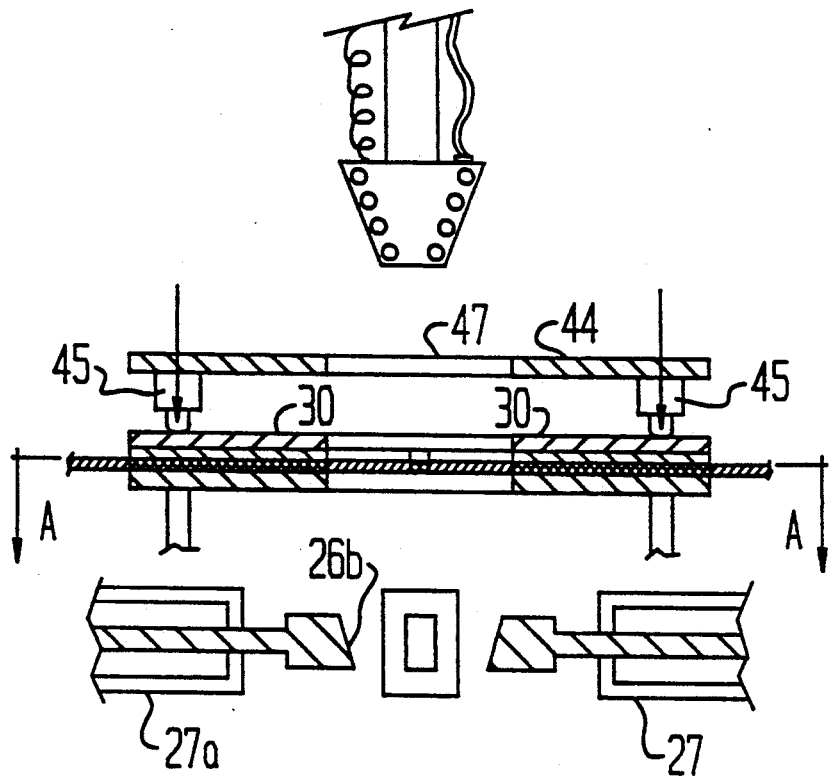
FIG. 2 is an enhanced side view of the cutting apparatus utilized in the present invention.

Referring to FIGS. 1, 2, 3A and 3B, the flat support bed 16 includes a centrally located circular hole or aperture 24 through which, as will be discussed in detail below, the pnuematic or hydraulically operated mandrel 12 reciprocates. The lower portion of the frame 10 beneath the feed bed 16 contains four reciprocating ultra-sonic weld heads 26 which reciprocate laterally 26a by means of pneumatic hydraulic cylinders 27, 27a. Weld heads 26 seal the container or flower pot cover as it is pushed through the aperture 24 overhead via hydraulic or pneumatic mandrel 12. As with the mandrel 12, the ultrasonic weld heads 26 may be controlled by an 8-bit microprocessor. As seen in FIGS. 2, 3 and particularly 7, the ultra-sonic weld heads are beveled upward 26b and have arcuate faces 26c which faciltate the formation of the container (flower pot cover) structure. The upward slope of the face 26c mates with the trapezoidally shape of the mandrel.

Figure 2A:
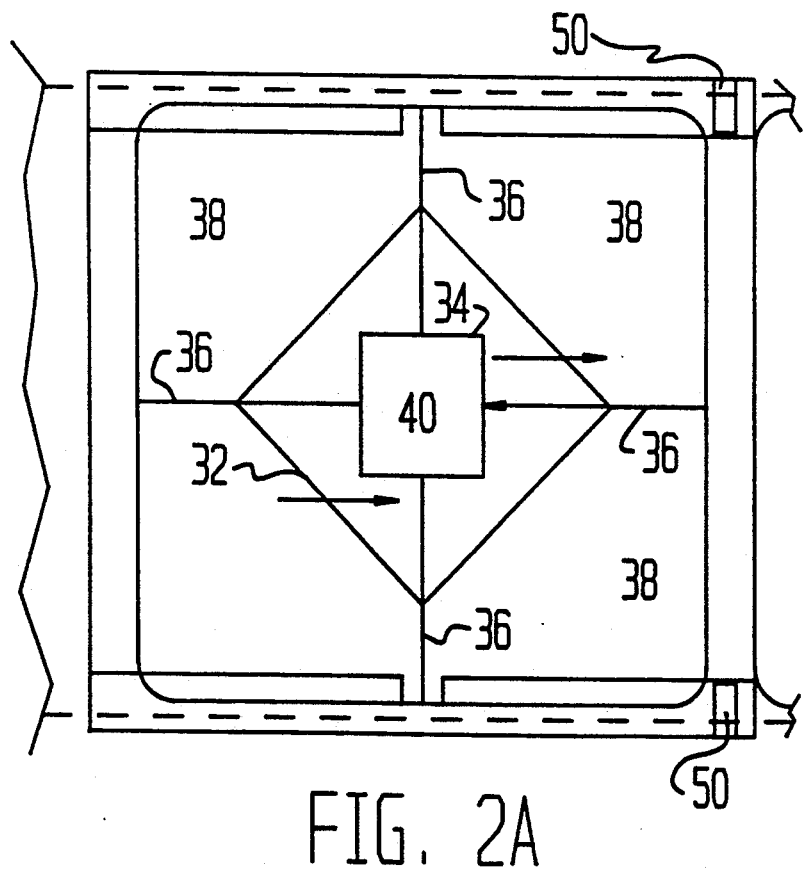
FIG. 2A is a plan view of the cutting apparatus along line A—A of FIG. 2.
Figure 3:
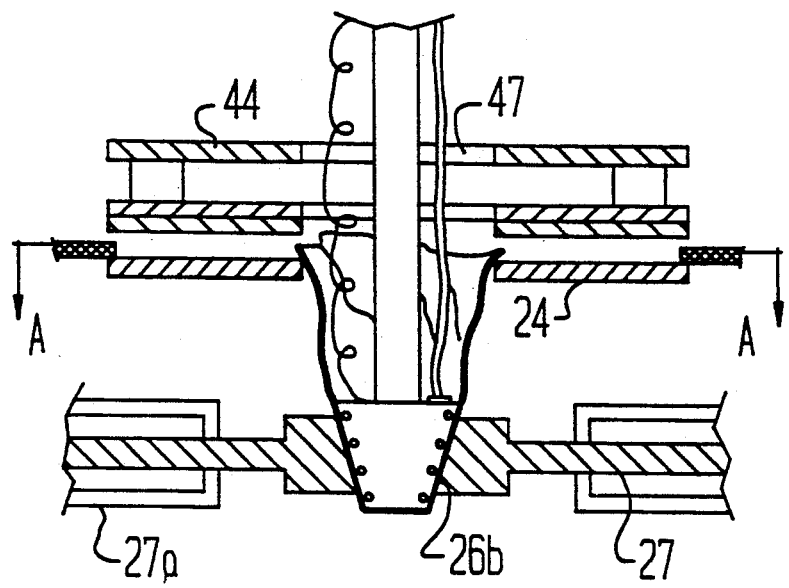
FIG. 3 is an enhanced side view of the apparatus of the present invention.
Figure 8:
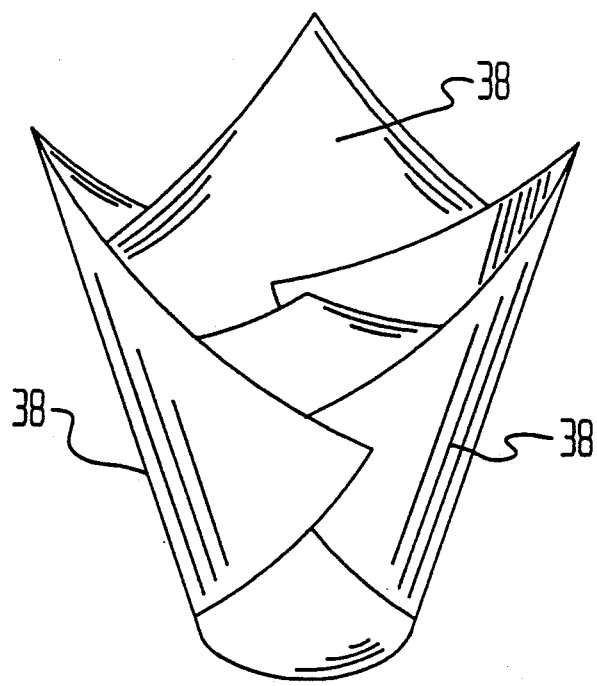
FIG. 8 is an isometric view of the formed container structure of the present invention.
Figure 8A:
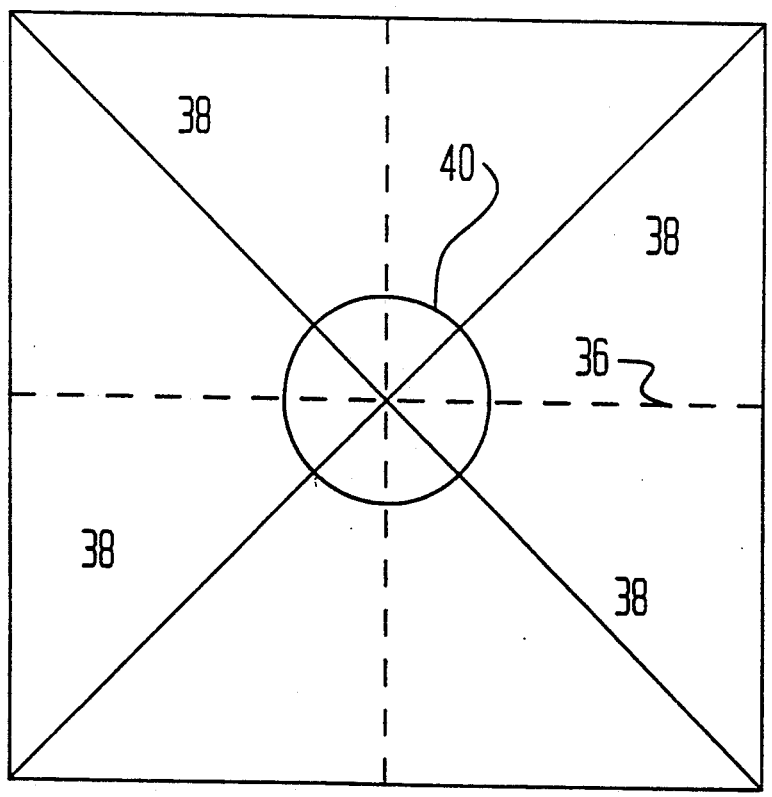
FIG. 8A is a plan view of the cut container form prior to being fabricated into a container structure.

Referring to FIG. 2 and 3, the die cutting mechanism 28 of the present invention is illustrated in detail. The die cutting mechanism 28 comprises a die frame 30 including, a diamond outer frame 32 and square-shaped inner frame 34. The frames retain four blades 36 which extend radially outward at respective 12 o'clock, 3 o'clock, 6 o'clock and 9 o'clock positions relative to the rolled substrate material 22 (i.e. at 90 degree angles with respect to each other). Referring to FIGS. 2A and 8A, the die blades cut the form into quarter sections 38 which surround a central section 40 which, during fabrication, will form the base of the container. The die also contains blades 42 about its outer periphery which serve to cut the form into a square shape. While the present invention has and is being described in the context of a die which creates four slits which creates four quartered sections about a central section, it is to be appreciated that the present invention can be utilized with dies which create more or less than four slits.

Figure 5:
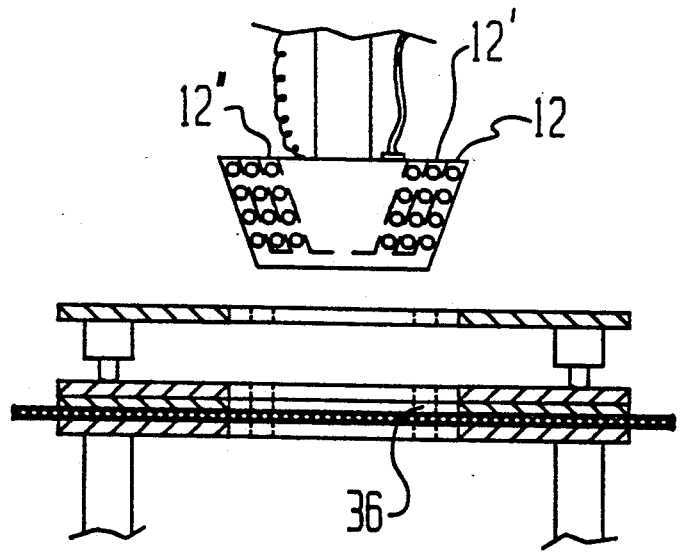
FIG. 5 is a side view of alternative mandrels and die apparatus to be utilized in the present invention.

The die is supported by an upper support frame 44 fixed to frame 10 which includes contains pneumatic cylinders 45. Cylinders 45 function to vertically control the actuation of the die frame 30 and blades 36, 42. Upper support frame 44 includes an aperture 47 for the reciprocating mandrel 12. As is shown in FIG. 5, the respective lengths of die blades 36, 42 and the diameter of mandrel (piston) 12 can be varied so as to fabricate containers and flower pots having differing sizes and dimensions.

Referring to FIG. 1, the container itself is formed from a flexible paper-like substrate material 22 such as PVC, wax paper, polyester, polyethelene, cellulose acetate butyrate, polystyrene, etc. The container of the present invention can further be constructed from metals such as copper, gold and silver foils. Three materials known to possess particularly ideal characteristics for use in the present invention include 0.001 mil colored aluminum foil (with or without a heat release coating); 0.003 or 0.004 mil polyester; and 0.00125 mil polystyrene. Polyester is particularly desirable because it effectively seals itself using ultrasonic radiation, microwaves or plastic welding.

Figure 3A:
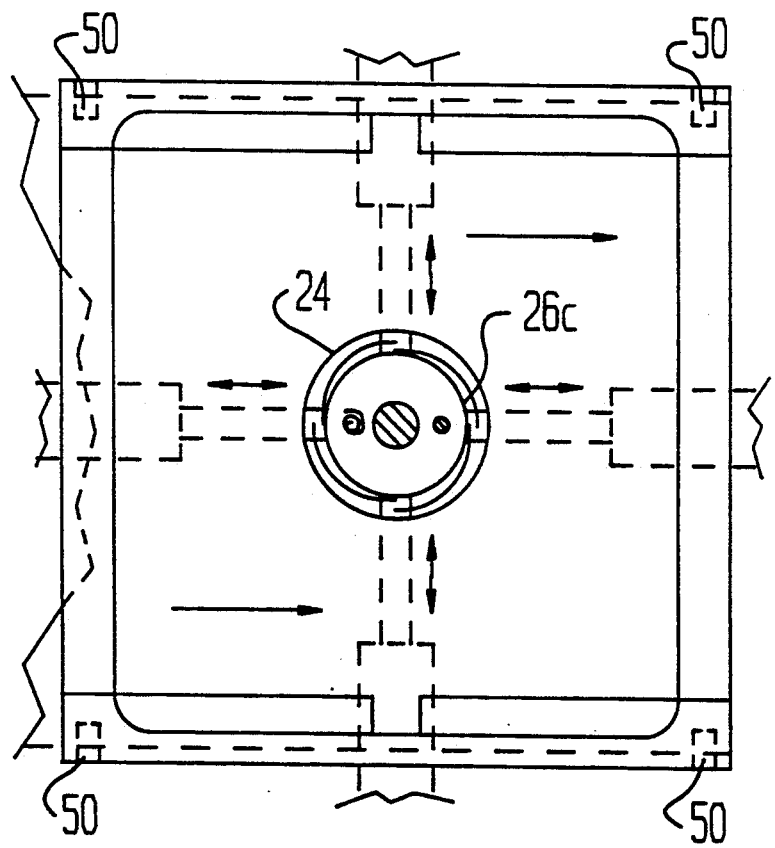
FIG. 3A is a plan view of the apparatus of the present invention along line A—A of FIG. 3.
Figure 6:
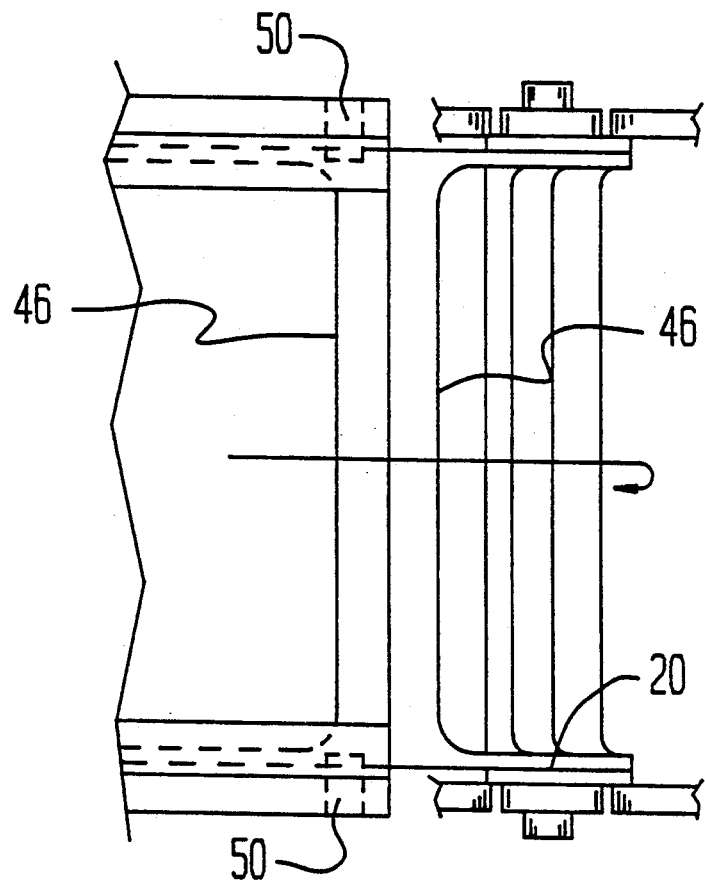
FIG. 6 is a plan view of the take-up roll of the present invention.
Figure 7:
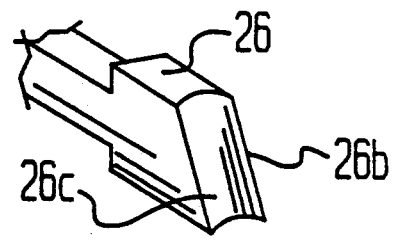
FIG. 7 is an isometric view of an ultrasonic weld head to be utilized in the apparatus of the present invention.

The substrate material which comes in a roll form 22 is attached to the feed roller 18 which feeds the paper-like material across the feed bed 16, and is picked up by pick-up roller 20. As seen more clearly in FIG. 6, in operation, the pick-up roller will 20 will pick up the skeleton 46 surrounding the substrate mold after the each respective container is punched through the aperture 24 by mandrel 12 and formed into a container by the weld heads 26. Referring to FIGS. 2A and 3A, the substrate is retained on the feed bed 16 by guides 50. Guides 50, which may extend the length of the feed bed 16 table, aid in the control of the substrate during operation. The guides 50 terminate at the take-up roller, around which the substrate 22 is wrapped to initiate the feeding action.

The ultrasonic welded heads 26 and the die are lowered by the air pressure of positioning feedback provided by a position sensor. As previously noted, an 8-bit microprocessor can be utilized for overall control and will monitor the relative position of the cutters, ultrasonic welding heads, position of the ultra-sonic weld, pick-up roller on/off, and distance stroke by monitoring the position sensors and alternatively through the use of an optical encoder. It is to be appreciated by those skilled in the art that the control of the mandrel and weld heads is conventional. As previously noted with reference to FIG. 4, the mandrel 12 and the die 26 are replaceable so as to create containers having varying dimensions and the feed table 16 should be large enough to accommodate a ten inch substrate.

The operation of the present invention is now described with reference to the enclosed Figures. Initially the paper substrate form 22 is attached to the feed roller 18 and a lead quantity is fed over the feed table 16, secured within the guides 50 and attached to the take-up roll 20.

Once in position, a start button is depressed and, as seen more clearly in FIG. 2, the die 28 is depressed against substrate 22 by pneumatic cylinders 45. Blades 42 cut a square section from the substrate material. Simultaneously, blades 36 cut four radially extending slits about a central solid section 40, thus dividing the form into quarters. As is seen in FIG. 5, the size of die blades can be varied so as to facilitate the fabrication of varying container sizes. The microprocessor may monitor the downstroke of the die by means of conventional electronic circuitry such as a home position and stroke complete sensor.

At a stroke complete signal, the mandrel 12 will feed down and force the cut form through hole or aperture 24. A piston home and down sensor for the mandrel will also be monitored as a latch by the microprocessor. Referring to FIGS. 3, 8 and 8A, as the mandrel pushes downward into the center of the form and the form breaks free of the slits and is thrust through the aperture, and sidewalls defined by each quarter section bend upward about the trapezoidal side walls of the mandrel 12.

Figure 4:
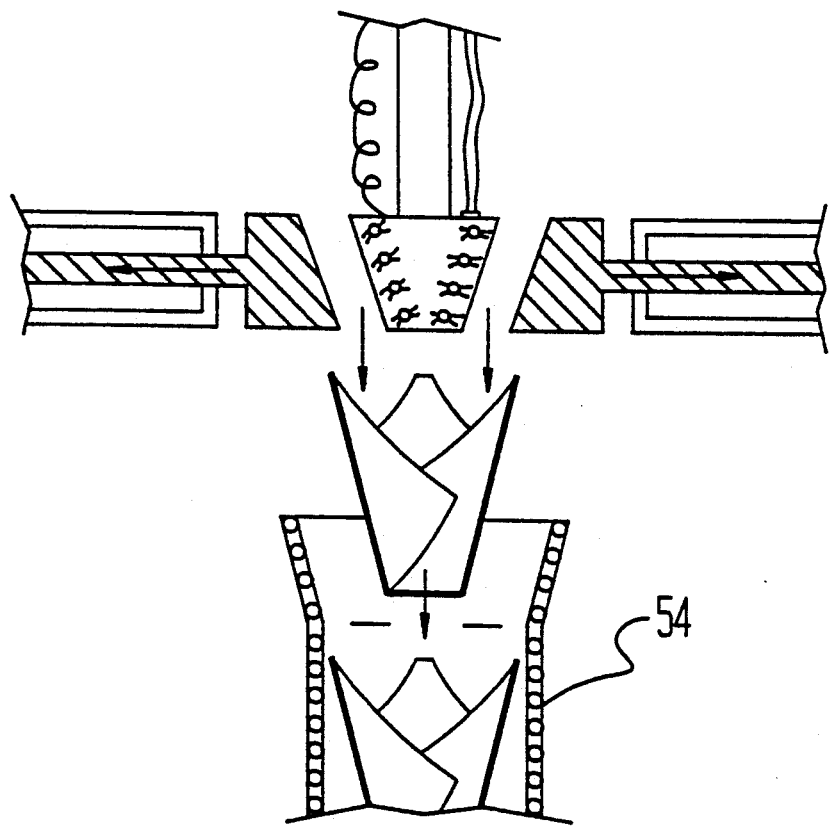
FIG. 4 is a side view of the ultrasonic sealing apparatus and air operated mandrel utilized of the present invention.

At position down, the microprocessor signal ultrasonic weld heads 26 into the weld position (FIGS. 3 and 3A) and execute an ultrasonic weld for a predetermined period, typically 3-5 seconds. After the predetermined period, the weld heads 26 are pneumatically (hydraulically) returned to home upon a signal from the microprocessor as shown in FIG. 4 and the mandrel 12 continues to stroke downward. At a predetermined point, the expandable air lines 14 are activated, thereby blowing air through apertures 13 and thus blowing the fabricated container off the mandrel 12. The completed cover will then fall into a catcher/cage or recepticle 54. The piston is then retracted to the home position and the take-up roller 20 advances to move the skeleton of the stamped cover substrate and prepare for the next cycle. The final container structure, comprising four sealed sidewall sections is illustrated in FIG. 8. While the present invention has been described as utilizing ultrasonic weld heads to fabricate the container structure, it is to be appreciated that other welding techniques may be utilized depending upon the material used. For example, when metallized PVC is utilized as the substrate material, a metal welder such as the Sonoband Model MH2015 Wedge-reed system should be used.

The present invention has been described with reference to the enclosed Figures. It is to be appreciated that the true nature and scope of the present invention is determined with reference to the claim attached hereto.

What is claimed is:

1. Apparatus for fabricating a container structure comprising:

a frame supporting a reciprocating mandrel and a feed bed, said feed bed having an aperture positioned such that said reciprocating mandrel reciprocates into and out of said aperture;

means for feeding a substrate across said feed bed and aperture;

die means fixed to said frame in proximity to said aperture, said die cutting a form from said substrate, said cut form having a central section situated over said aperture and a plurality of surrounding sections defined by at least four radial slits cut by said die, said radial slits extending outward from said central section, each of said surrounding sections folding to form a sidewall of a container structure when said reciprocating mandrel pushes said central section through said aperture; and a plurality of weld heads situated behind said feed bed for sealing said folded sidewalls so as to form a container.

2. Apparatus for fabricating a container structure comprising:

a frame supporting a reciprocating mandrel and a feed bed, said feed bed having an aperture positioned such that said reciprocating mandrel reciprocates into and out of said aperture;

means for feeding a substrate across said feed bed and aperture;

die means fixed to said frame in proximity to said aperture, said die means cutting a form from said substrate, said cut form having a central section overlying said aperture and a plurality of surrounding sections defined by a plurality of radial slits cut by said die, said radial slits extending outward from said central section, each of said surrounding sections folding to form a sidewall of a container structure when said reciprocating mandrel pushes said cut form through said aperture; and means for sealing said folded sidewalls so as to form a container.

3. The apparatus of claim 2 wherein said sealing means comprises ultrasonic sealing means.

4. The apparatus of claim 2 wherein said mandrel is trapezoidally shaped.

5. The apparatus of claim 2 further comprising means for guiding said substrate across of said feed bed.

6. The apparatus of claim 2 further comprising means for expelling said formed container away from said apparatus.

7. The apparatus of claim 6 wherein said expelling means comprises compressed air expelled through said mandrel.

* * * * *